Aug. 16, 1932.                J. E. REGAN                1,872,005
                               CONVEYER
                         Filed Feb. 7, 1930        6 Sheets-Sheet 1
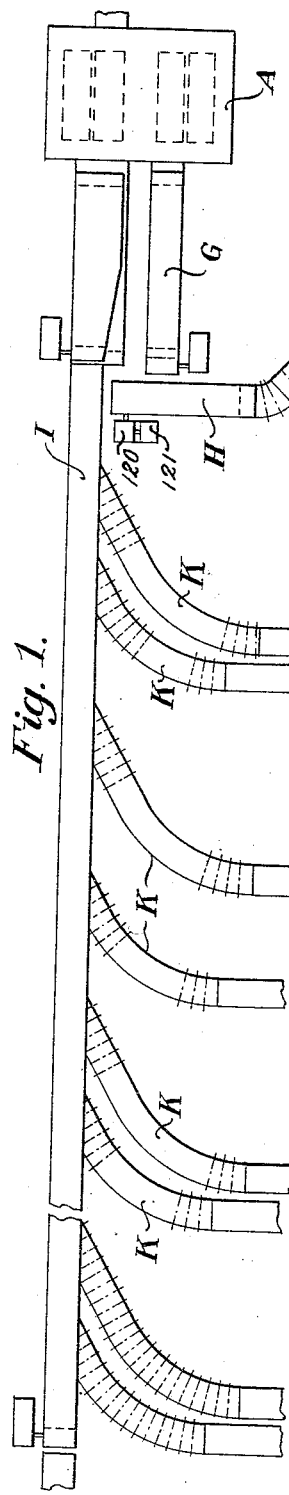
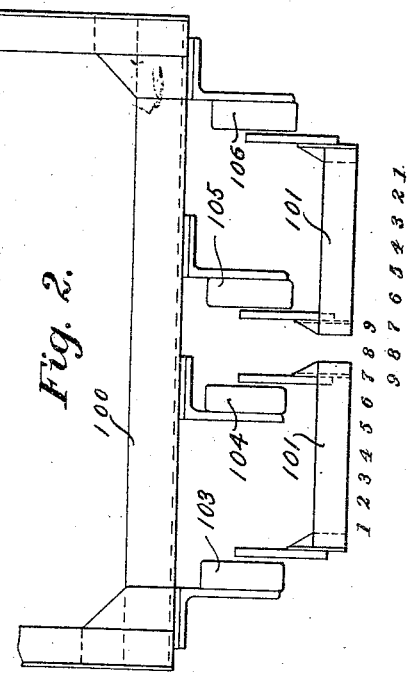
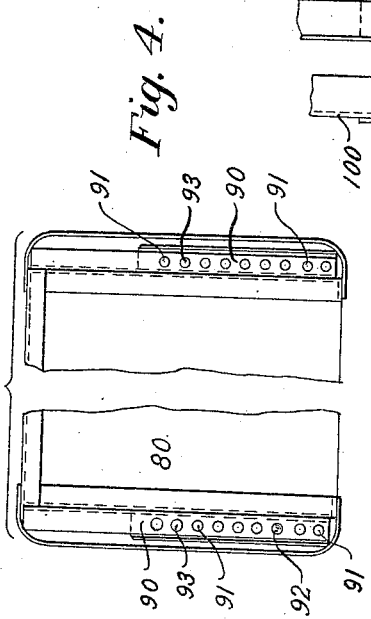
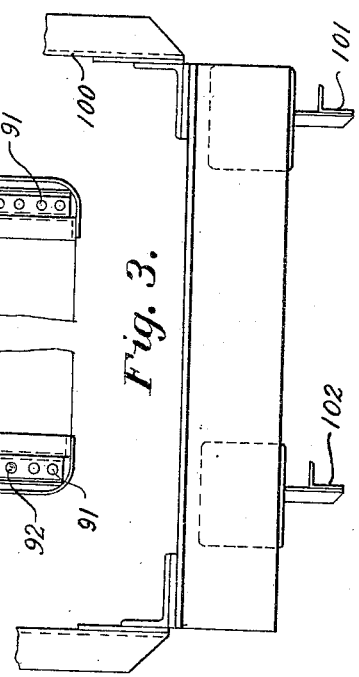
Inventor
John F. Regan,
by Roberts, Cushman & Woodberry
Attys.

Aug. 16, 1932. J. E. REGAN 1,872,005
CONVEYER
Filed Feb. 7, 1930 6 Sheets-Sheet 2

Inventor.
John E. Regan,
by Roberts Cushman & Woodbury
Att'ys.

Aug. 16, 1932.  J. E. REGAN  1,872,005
CONVEYER
Filed Feb. 7, 1930  6 Sheets-Sheet 4
Fig. 11.
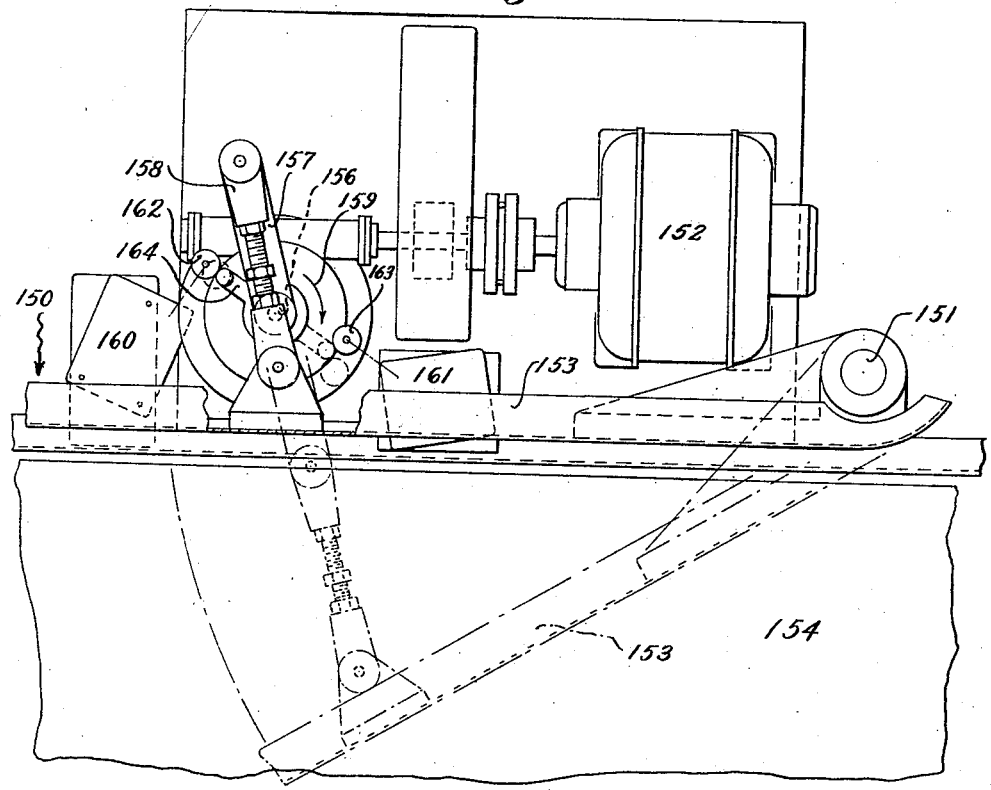
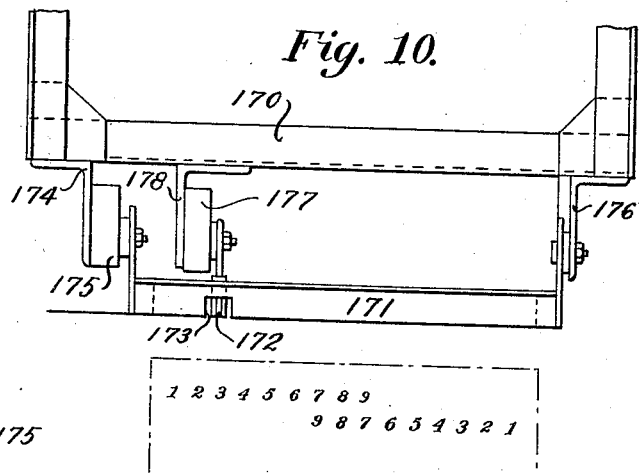
Fig. 10.
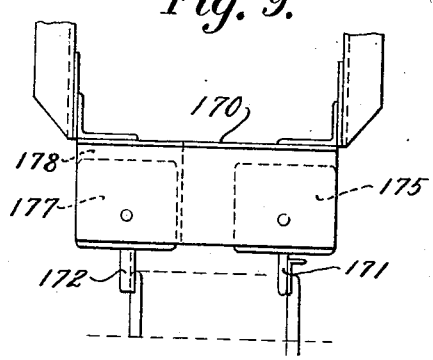
Fig. 9.
Inventor.
John E. Regan.
by Roberts Cushman + Woodberry
Attys.

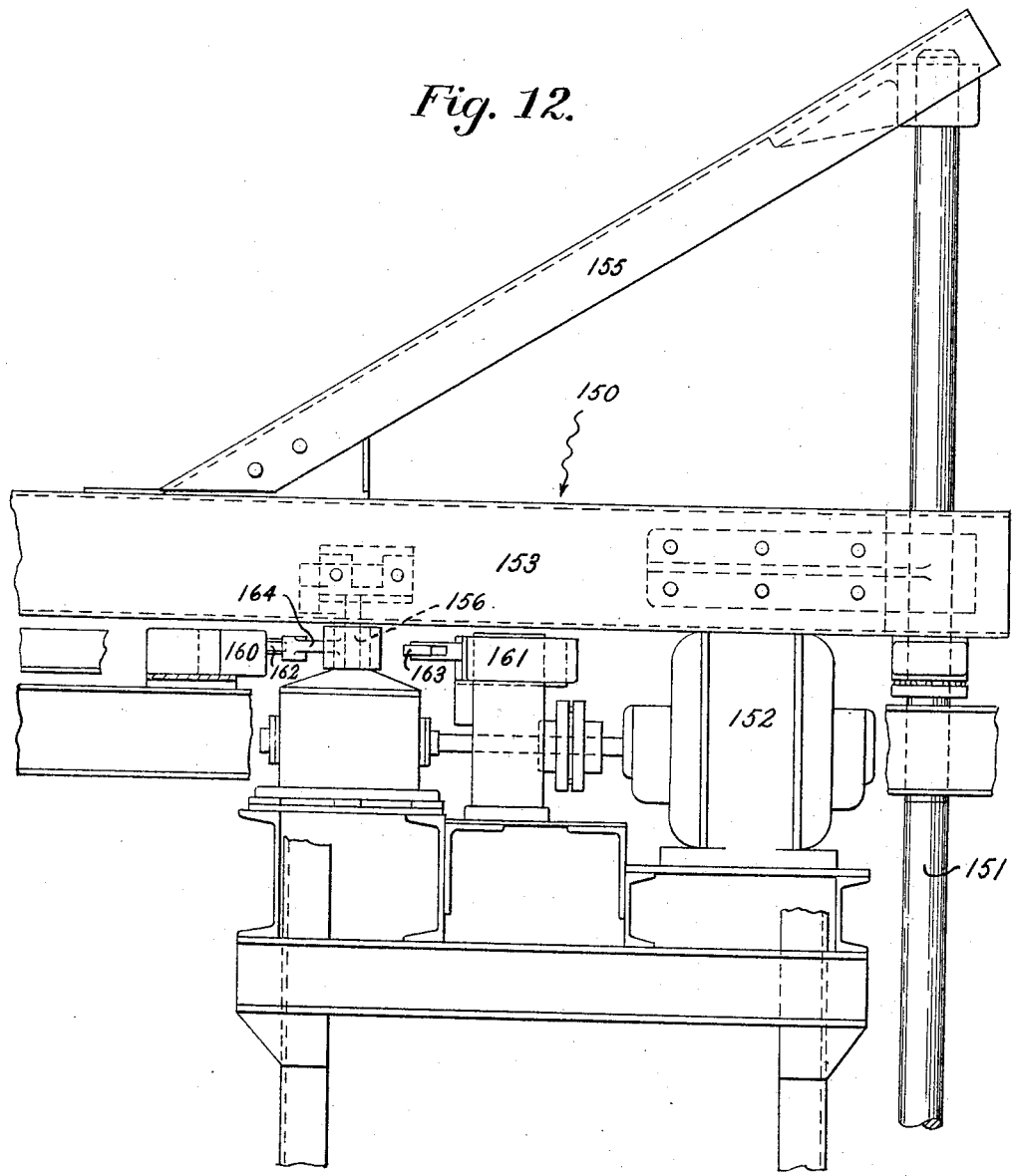

Aug. 16, 1932. J. E. REGAN 1,872,005
CONVEYER
Filed Feb. 7, 1930 6 Sheets-Sheet 6

Inventor.
John E. Regan.
by Robert Cushman & Woodbury
Attys.

Patented Aug. 16, 1932

1,872,005

UNITED STATES PATENT OFFICE

JOHN E. REGAN, OF SYRACUSE, NEW YORK, ASSIGNOR TO THE LAMSON COMPANY, OF SYRACUSE, NEW YORK, A CORPORATION OF MASSACHUSETTS

CONVEYER

Application filed February 7, 1930. Serial No. 426,526.

This invention relates to improvements in conveyer mechanism and more particularly in such mechanism wherein articles are first divided into two groups and such groups are further divided.

In the embodiment of the invention selected for illustration:

Fig. 1 is a plan view of the conveyer mechanism illustrating particularly the relation of the various conveyers;

Fig. 2 is a front elevation;

Fig. 3 is a side elevation of the means by which the articles to be handled are divided into two groups;

Fig. 4 is a plan view of a truck which is the article that the illustrated embodiment is adapted to handle;

Figs. 9 and 10 are elevation and side views respectively of a further detail of this invention;

Figs. 11, 12 and 13 are plan, side and end views of the deflector mechanism employed in connection with the branch conveyers illustrated in Fig. 7.

Figure 5:
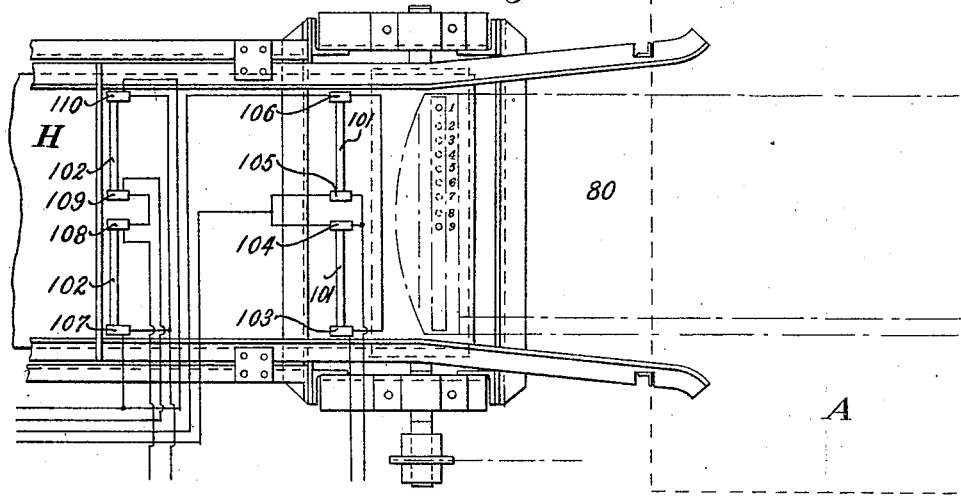
Fig. 5 is a plan view illustrating the relation of certain of the conveyers.

The embodiment selected for illustration discloses the manner of handling the trucks which are filled in the vertical conveyer illustrated in my copending application, Serial No. 426,525, filed February 7, 1930. The trucks filled in the vertical conveyer A are removed therefrom by the conveyer G by which they are transferred to a conveyer H. The conveyer H is reversible and distributes the truck either to the conveyer I or to the conveyer J. Connected to the conveyer I are a plurality of branch conveyers K to which the trucks are delivered through the mechanism about to be described.

The truck 80 illustrated in Fig. 4 is substantially rectangular in form and is provided at the upper end of each end wall with bars 90 having perforations 91 therein adapted to receive one or more pins 92. It will be noted that the bars 90 extend from one side only of the truck. Referring to Fig. 4 it will be obvious, therefore, that when the truck is travelling to the right the bars 90 extend from the right side wall of the truck while when the truck is travelling to the left, the bars 90 extend from the left side of the truck. It will further be noted that in the present embodiment each bar 90 of the truck is provided with nine perforations. The eighth perforation 93 is located along the central line of the truck so that there are seven holes on one side of the center line and one hole on the other side. The various operations about to be described are controlled by the position of the pin or pins 92 in the forward end of the truck.

The direction control for the conveyer H which is first actuated by the pin or pins includes a frame 100 extending over the conveyer G and from which depends pairs of tab plates 101, 102. By referring to Fig. 2 it will be noted that the tab plates 101 are aligned and separated from each other so that any pin in the perforation 93 of the truck will have no effect whatsoever. Each tab plate 101 is associated with two circuit control devices rigidly secured to the frame 100 and is pivotally supported thereby. Thus one tab plate 101 is associated with circuit breakers 103 and 104, while the other tab plate is associated with circuit breakers 105 and 106. It will be understood that when a tab plate is struck by a pin in a passing truck, the circuits controlled by the two circuit breakers associated with the particular tab plate will be broken. The tab plates 102 are similar in all respects to the tab plates 101, but the circuit control devices associated therewith are circuit makers 107 and 108 and 109 and 110 respectively. The particular construction of the circuit control devices forms no part of the present invention and hence is not shown or described. In accordance with the usual well known practice, however, the devices are tripped when the tab plates are struck and swung by the pins on the trucks. It is enough here to say that circuits are broken when the plates 101 are swung and that circuits are made when the plates 102 are swung.

The conveyer H is positively driven by a motor 120 which acts in the usual manner through a reducer 121. A suitable brake (not shown) is provided to stop the motor and conveyer instantly as soon as the supply of current ceases. The motor 120 is reversible and the direction of travel of the belt of the conveyer H is accordingly controlled by a reversing switch 122.

The switch 122 may be of any desired type and I have therefore elected to show it diagrammatically as a magnetic switch comprising coils 125 and 126 which control switches 127 and 128 respectively. The switch is of the usual type wherein during the energizing of one coil and the consequent closing of the switches controlled thereby, the closing of the switches controlled by the other coil will be prevented if such coil is later energized.

Figure 6:
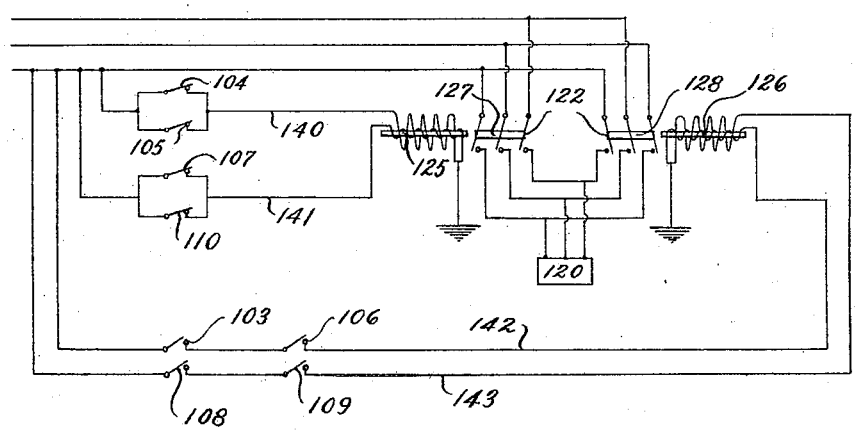
Fig. 6 is a wiring diagram illustrating the relation of the direction control to the magnetic reversing switch and motor.
Figure 7:
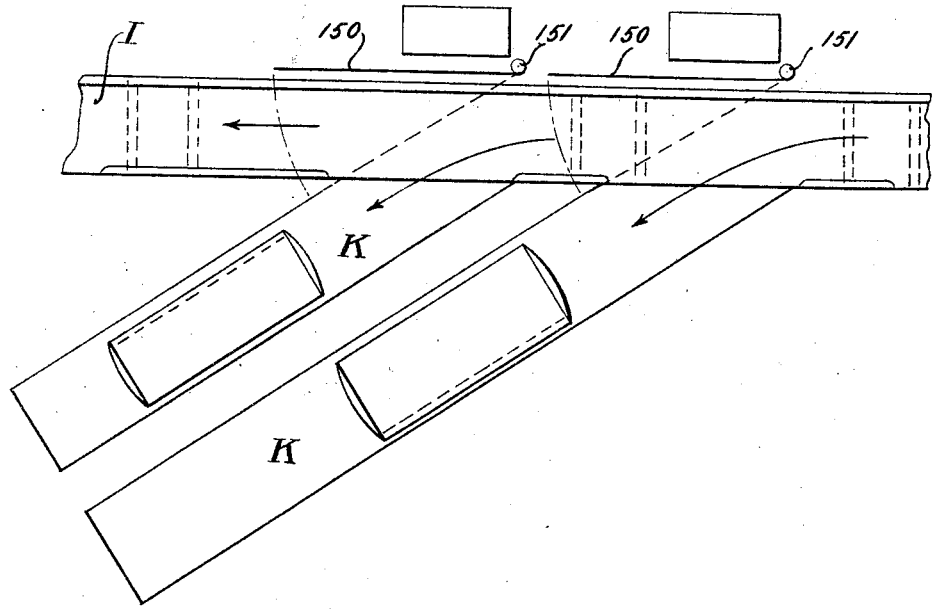
Fig. 7 is a plan view of one of the conveyers and of portions of the branch conveyers leading therefrom.
Figure 8:
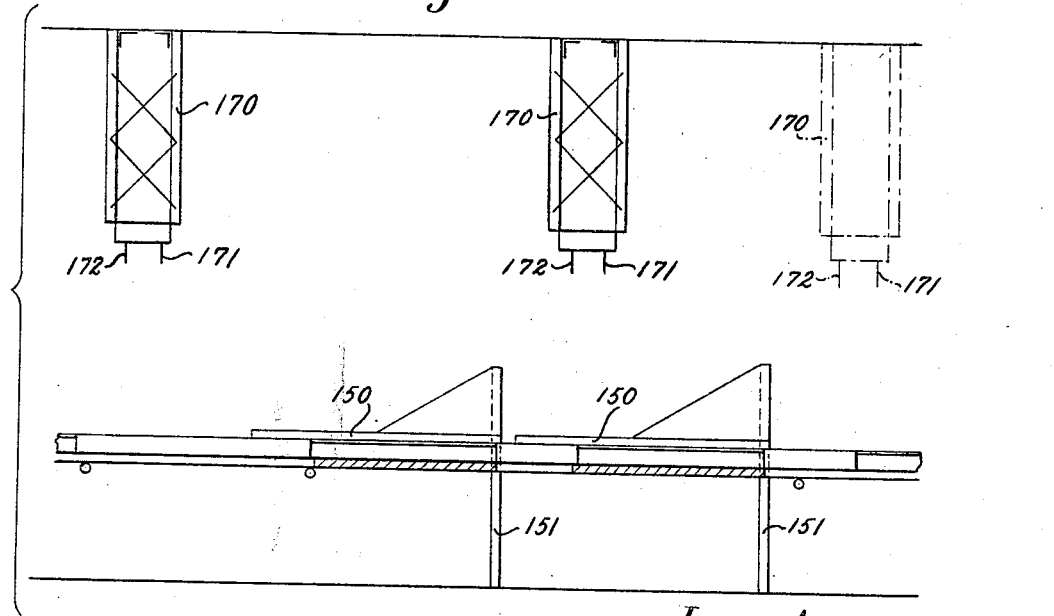
Fig. 8 is a side view of such conveyer.
Figure 13:
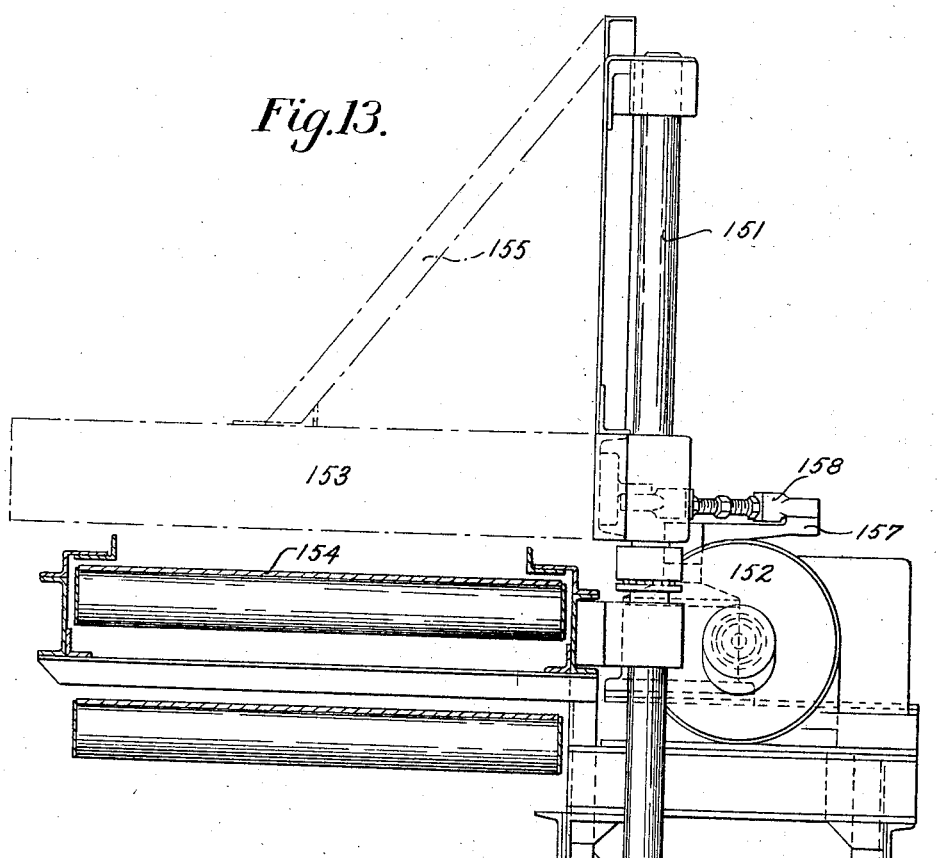

Referring to Fig. 6 it will be noted that circuits 140 and 141 each lead to coil 125 while circuits 142 and 143 each lead to coil 126. The circuit 140 includes circuit breakers 104 and 105 in parallel and the circuit 141 includes circuit makers 107 and 110 in parallel. The circuit 142 includes circuit breakers 103 and 106 in series and the circuit 143 includes circuit makers 108 and 109 in series. Hence the circuit 140 will only be opened and the circuit 143 will only be closed when both tab plates 101 and both tab plates 102 are swung whereas circuit 141 will be closed and circuit 142 will be opened when either of the tab plates 101 and the tab plate 102 beyond it are swung.

Let us assume that the switch 122 is set so that the conveyer H is travelling toward the conveyer I in which case the coil 125 of the switch is in control. If the truck 80 approaching the tab plates 101 has a pin in any one of the seven holes at the right of the center line and no pin in the ninth hole it will engage and swing the right hand tab plates 101, 102 only (see Fig. 2). Thereupon the circuit breakers 105 and 106 will have no effect on the circuit 140 but will open the circuit 142 while the circuit makers 109 and 110 will close the circuit 141 but will have no effect on the circuit 143. Similar results will follow if the truck has a pin in the ninth hole and none in the first seven. When, however, the truck has pins in any one of the first seven holes and also in the ninth hole all the tab plates 101 and 102 will be swung. Under such conditions the circuit 140 as well as the circuit 142 will be opened and later the circuits 141 and 143 will both be closed. The circuit makers are so adjusted, however, that the makers 108 and 109 will act in advance of the makers 107 and 110 and consequently the conveyer which has been brought to rest by deenergizing the coil 125 will be caused to travel toward the conveyer J under the influence of the coil 126.

When the coil 126 is energized the next truck 80 to approach the direction control will deenergize the coil 126 and stop the conveyer H regardless of which holes other than the eighth hole are provided with pins 92. If the truck has pins in any of the first seven holes only or a pin in the ninth hole only the coil 125 will be energized and the conveyer H start traveling toward the conveyer I. If the truck should have pins in any of the first seven holes and also in the ninth hole the coil 126 will be reenergized and the conveyer H will resume its traveling toward the conveyer J.

It will be understood that the trucks are so spaced and the direction control so located with reference to the conveyer H that the truck actuating the direction control is delivered by the conveyer H to the conveyers I or J before the succeeding truck actuates the control. The trucks having pins 92 at both sides of the center line are delivered to the conveyer J and transported to a desired destination. The trucks delivered to the conveyer I are further handled as will be now set forth.

The trucks transferred by the conveyer H to the conveyer I travel along such conveyer in the usual manner. Extending from one side of the conveyer I are a plurality of branch conveyers K and associated with each branch conveyer K is a deflector 150 which is suitably mounted upon a shaft 151 and caused to operate by a motor 152. The shaft 151 is mounted in suitable bearings and carries a deflector bar 153 which is adapted to extend over the belt 154 of the conveyer I. A suitable brace 155 is provided to hold the deflector bar 153 in the horizontal position.

The motor 152 is mounted upon a support at one side of the conveyer I and actuates, through suitable gearings, a shaft 156 on which is supported a crank arm 157 having at one end a pivotal connection with one end of a bar 158 pivotally attached at its other end to the deflector bar 153. It will be understood that the rotation of the shaft 156 which follows the direction indicated by the arrow 159 causes the deflector bar 153 to be advanced into the deflecting position as shown in dotted lines in Fig. 11, or retracted to the inoperative position shown in full lines in that figure.

Mounted adjacent the shaft 156 are a pair of circuit breakers 160 and 161. These circuit breakers are of the usual type having trips 162 and 163 respectively which, when actuated, cause the circuit breakers to function in the usual manner. Fixed on the shaft 156 is an arm 164 so located that it follows the crank arm 157 as the shaft is rotated. The trips 162 and 163 of the circuit breakers 160 and 161 extend into the path of the arm 164 as the shaft is rotated and are actuated thereby. The motor 150 is driven by an automatic starter 165 shown diagrammatically in Fig. 14 and which may be of any desired type.

Associated with each deflector is a control device which is engaged by the pins on the trucks transferred by the conveyer I. This device comprises a frame 170 extending over the belt 154 of the conveyer I from which depends a tab bar 171 and a tab 172 as shown particularly in Figs. 9 and 10. The tab bar 171 is pivotally mounted and provided with a notch 173 through which a suitably located pin on a truck will pass freely. It will be understood that if the truck carries any pins 92 which are not so located that they pass freely through the notch 173, the tab bar 171 will be swung relative to the frame 170. Fixed upon a bracket 174 is a circuit maker 175 from which one end of the bar 171 is supported. The other end of the bar is supported by a bracket 176. A second circuit maker 177 is supported on a bracket 178 behind the brackets 174 and 176. The tab 172 is pivotally swung from the circuit maker 177. The circuit makers 175 and 177 are similar to the circuit makers and circuit breakers which are elements of the direction control previously described and the swinging of the tab bar 171 or the tab 172 trips the circuit makers by which they are carried. The tab 172 is directly behind the notch 173 in the tab bar 171 and will therefore be engaged and swung by the pin on any truck which passes through the notch.

Figure 14:
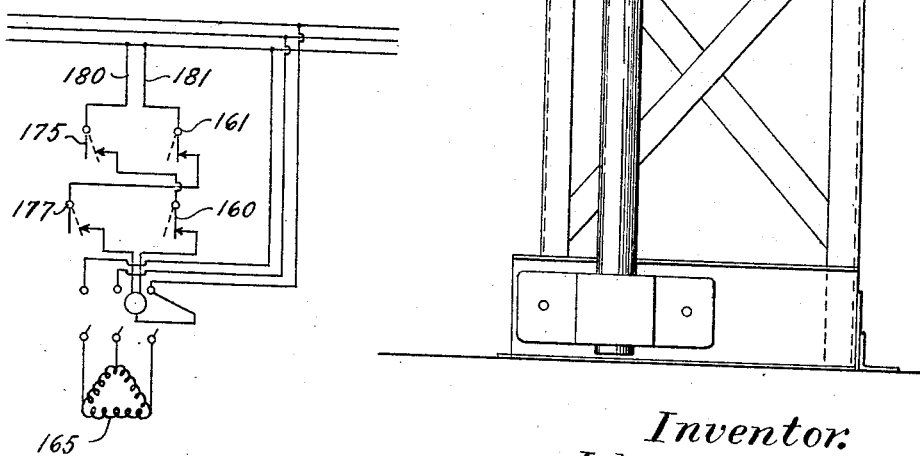
Fig. 14 is a diagram of the wiring controlling the operation of a deflector mechanism.

Referring to Fig. 14 it will be noted that the circuit maker 175 and the circuit breaker 160 are in series in a circuit 180 leading to the automatic starter 165 and that the circuit maker 177 and the circuit breaker 161 are in series in a circuit 181 also leading to the automatic starter 165. The arm 164 however, when the deflector is at rest, is in functioning engagement with one of the circuit breakers. If the deflector is open as shown in full lines on Fig. 11, the circuit breaker 160 is tripped and the circuit 180 is open while if the deflector is closed, as shown in dotted lines on Fig. 11, the circuit breaker 161 is tripped and the circuit 181 is open.

Assume that the deflector is in the open position in which case the circuit breaker 160 is closed and the circuit breaker 161 is open. If the truck approaching the control device has its pin so located that it will not pass through the notch 173 but will trip the tab bar 171 the circuit 181 will not be closed by the circuit maker 177, due to the position of the circuit breaker 161. Consequently the starter 165 will not be energized and the deflector will remain open. If, however, the pin 92 on the approaching truck is so located that it will pass through the notch 173 and trip the tab 172 the circuit maker 175 will close the circuit 180 energizing the starter 165 and cause the deflector bar to swing into the closed position and deflect the truck to the conveyer K. When the deflector is closed and the circuit breaker 161 accordingly is tripped the deflector will remain closed until a truck approaches the control device having its pin located so as to engage and swing the tab bar 171.

It will, of course, be understood that the notch 173 in each tab bar 171 together with the tab 172, will vary in location so that a pin may be set on a truck to insure its delivery to any desired branch conveyer K. Since the eighth hole in the bar 90 is employed as pointed out in my copending application for a certain purpose there will be no tab and notch for such location of the pin. The pin, in the eighth hole of the bar at the forward end of a truck will engage the tab bar 171 of each deflector mechanism and cause the deflector bar, if closed, to open. When this truck reaches its destination the second pin in the bar will pass through the notch 173 and trip the tab 172 to close the deflector bar.

From the description above given it will appear that the trucks delivered onto the conveyer G are divided by the conveyer H those trucks having pins in both sides of the central line being sent to the conveyer J, while those having pins on one side only of the central line are sent to the conveyer I. The trucks sent to the conveyer I are carried along such conveyer until they reach the deflector mechanism associated with the branch conveyer K to which they are intended. When this mechanism is reached the pin on the truck will pass through the notch 173 in the tab bar 171 and will actuate the tab bar 172, thus causing the deflector bar 153 associated with such branch conveyer to move into the closed position if it then be open and deflect the trucks onto the branch conveyer.

Should there be a number of trucks delivered onto the conveyer G, all intended for the same branch conveyer K, it is necessary that only the first and last trucks of the group be provided with pins. It will be noted that the various mechanisms described remain in the position in which they are set until they are positively shifted into another position. Consequently a train of trucks all for the same destination will travel to such destination without any change of mechanism.

Certain of the conveyers K are as shown in Fig. 1 arranged in pairs and the destination of the trucks is so determined that those having one side open (see Fig. 4) are delivered upon conveyers on which the open sides will be readily accessible. Thus referring to Fig. 1 the trucks whose right sides are open will be delivered to a left conveyer of any pair of conveyers K and those whose left sides are open will be delivered to a right conveyer.

While one embodiment of this invention has been shown and described it will be understood that I am not limited to the specific structure and features therein since other embodiments of this invention might be made without departing from the spirit and scope thereof as set forth in the following claims.

I claim:

1. Conveyer mechanism comprising means for separating articles delivered thereto into groups, and means for diverting the articles in one group to predetermined destinations, the first said means being controlled by each of the articles transported and the second said means being controlled by each of the articles in the group transported by the conveyer mechanism to predetermined destinations.

2. Conveyer mechanism comprising means for separating articles delivered thereto into groups, means for diverting the articles in one group to predetermined destinations, control devices associated with the first said means and actuated by each article transported by the conveyer mechanism and control devices associated with the second said means, and actuated by each article in the aforementioned group.

3. Conveyer mechanism comprising a plurality of conveyers by which articles are successively transported including a plurality of branch conveyers, a distributing conveyer by which articles are delivered to the branch conveyers, a reversible conveyer which, when operating in one direction delivers articles to the distributing conveyer, and a feeding conveyer which delivers articles to the reversible conveyer.

4. Conveyer mechanism comprising a plurality of conveyers by which articles are successively transported including a plurality of branch conveyers, a distributing conveyer by which articles are delivered to the branch conveyers, a reversible conveyer which, when operating in one direction delivers articles to the distributing conveyer, and a feeding conveyer which delivers articles to the reversible conveyer and means associated with the distributing and feeding conveyers and actuated by an article thereon for selecting the particular branch conveyer to which the article is delivered and determining the direction in which the reversible conveyer will transport the article.

5. Conveyer mechanism comprising a conveyer onto which articles are fed, a second conveyer onto which the articles are fed by the first conveyer, means for causing said second conveyer to transport the articles in different directions and means actuated by the articles for determining the direction in which the articles are transported.

6. Conveyer mechanism comprising a conveyer onto which articles are fed, a second conveyer onto which the articles are fed by the first conveyer, means for causing said second conveyer to transport the articles in different directions and means actuated by the articles on the first conveyer for determining the directions in which they are transported by the second conveyer.

7. Conveyer mechanism comprising an article feeding conveyer, a second conveyer onto which articles are fed by the first, means for operating the second conveyer, and means for determining the direction in which the conveyer shall operate, said last named means being controlled by the articles transported by the second conveyer.

8. Conveyer mechanism comprising an article feeding conveyer, a second conveyer onto which articles are fed by the first, means for operating the second conveyer, and means for determining the direction in which the conveyer shall operate, said last named means being controlled by the articles on the first conveyer prior to their transportation by the second conveyer.

9. Conveyer mechanism comprising an article feeding conveyer, a second conveyer onto which articles are fed by the first, means for operating the second conveyer, and means for determining the direction in which the conveyer shall operate, said last named means being controlled by the articles prior to the feeding thereof onto the second conveyer.

10. Conveyer mechanism comprising a reversible conveyer, a feeding conveyer by which articles are delivered to the reversible conveyer, and means actuated by an article on the feeding conveyer for predetermining the direction of operation of the reversible conveyer when the article is delivered thereto.

11. Conveyer mechanism comprising a reversible conveyer, a feeding conveyer by which articles are delivered to the reversible conveyer, and means actuated by an article on the feeding conveyer for predetermining the direction of operation of the reversible conveyer when the article is delivered thereto, said means comprising pairs of tabs, the tripping of a single tab in each pair causing the reversible conveyer to operate in one direction and the tripping of both tabs in each pair causing the reversible conveyer to operate in the opposite direction.

12. Conveyer mechanism comprising a reversible conveyer, a motor for operating the same in either direction, a feeding conveyer by which articles are delivered to the reversible conveyer, and means including control devices in the circuit of the motor so associated with the feeding conveyer that they are actuated by an article transported thereby to determine the direction in which the reversible conveyer will transport such article.

13. Conveyer mechanism comprising a reversible conveyer, a motor for operating the same in either direction, a feeding conveyer by which articles are delivered to the reversible conveyer, and means including control devices in the circuit of the motor so associated with the feeding conveyer that they are actuated by an article transported thereby to determine the direction in which the reversible conveyer will transport such article, said means including two pairs of circuit breakers and two pairs of circuit makers and a tab for each pair that may be contacted by the article.

14. Conveyer mechanism comprising a reversible conveyer, a motor for operating the same in either direction, a feeding conveyer by which articles are delivered to the reversible conveyer, and means including control devices in the circuit of the motor so associated with the feeding conveyer that they are actuated by an article transported thereby to determine the direction in which the reversible conveyer will transport such article, said means including two pairs of circuit breakers and two pairs of circuit makers and a tab for each pair that may be contacted by the article the tabs for the circuit breakers being in alignment transversely of the conveyer in advance of the tabs for the circuit makers.

15. Conveyer mechanism comprising a reversible conveyer, a motor for operating the same in either direction, a feeding conveyer by which articles are delivered to the reversible conveyer, and means including control devices in the circuit of the motor so associated with the feeding conveyer that they are actuated by an article transported thereby to determine the direction in which the reversible conveyer will transport such article, said means including two pairs of circuit breakers and two pairs of circuit makers, and a tab for each pair that may be contacted by the article, the contact of the article with one circuit breaker tab and one circuit maker tab causing the motor to operate the conveyer in one direction and the contact of the article with both circuit breaker tabs and both circuit maker tabs causing the motor to operate the conveyer in the opposite direction.

16. Conveyer mechanism comprising a reversible conveyer, a motor for operating the same in either direction, a feeding conveyer by which articles are delivered to the reversible conveyer, and means including control devices in the circuit of the motor so associated with the feeding conveyer that they are actuated by an article transported thereby to determine the direction in which the reversible conveyer will transport such article, said means including two pairs of circuit breakers and two pairs of circuit makers, and a tab for each pair that may be contacted by the article, the contact of the article with either or both circuit breaker tabs stopping the motor when the reversible conveyer is operating in one direction and the contact of the article with either of the circuit maker tabs causing the motor to operate the reversible conveyer in the opposite direction.

17. Conveyer mechanism comprising a reversible conveyer, a motor for operating the same in either direction, a feeding conveyer by which articles are delivered to the reversible conveyer, and means including control devices in the circuit of the motor so associated with the feeding conveyer that they are actuated by an article transported thereby to determine the direction in which the reversible conveyer will transport such article, said means including two pairs of circuit breakers and two pairs of circuit makers, and a tab for each pair that may be contacted by the article, the contact of the article with either or both circuit breaker tabs stopping the motor when the reversible conveyer is operating in one direction, and the contact of the article with both circuit maker tabs causing the motor to resume operating the reversible conveyer in the same direction.

18. Conveyer mechanism comprising a reversible conveyer, a motor for operating the same in either direction, a feeding conveyer by which articles are delivered to the reversible conveyer, and means including control devices in the circuit of the motor so associated with the feeding conveyer that they are actuated by an article transported thereby to determine the direction in which the reversible conveyer will transport such article, said means including two pairs of circuit breakers and two pairs of circuit makers, and a tab for each pair that may be contacted by the article, the contact of the article with either of the circuit breaker tabs having no effect upon the motor when operating the reversible conveyer in one direction.

19. Conveyer mechanism comprising a reversible conveyer, a motor for operating the same in either direction, a feeding conveyer by which articles are delivered to the reversible conveyer, and means including control devices in the circuit of the motor so associated with the feeding conveyer that they are actuated by an article transported thereby to determine the direction in which the reversible conveyer will transport such article, said means including two pairs of circuit breakers and two pairs of circuit makers, and a tab for each pair that may be contacted by the article, the contact of the article with both circuit breaker tabs stopping the motor when the reversible conveyer is operating in either direction.

20. Conveyer mechanism comprising a distributing conveyer, a plurality of branch conveyers to which articles are delivered by the distributing conveyer, deflectors movable over the distributing conveyer and associated one with each branch conveyer and article control means for operating each deflector and positioned for engagement with an article on the distributing conveyer, each means including a tab bar having a notch therein and a tab behind the notch in the tab bar whereby either the tab bar or the tab is contacted by the article and the opened or closed position of the deflector is determined thereby.

21. Conveyer mechanism comprising a conveyer, a branch conveyer to which articles may be delivered by such conveyer, a movable deflector which, in the closed position, diverts articles transported by the first conveyer to the branch conveyer and, in the open position, permits the articles to pass the branch conveyer, means for operating said deflector, and article actuated means for controlling said deflector operating means including a tab bar having a notch therein and positioned in the path of travel of a pin carried by an article whereby the tab bar is contacted by the pin and the open position of the deflector determined unless the latter is so positioned that it passes through the notch in the tab bar.

22. Conveyer mechanism comprising a conveyer, a branch conveyer to which articles may be delivered by such conveyer, a movable deflector which, in the closed position, diverts articles transported by the first conveyer to the branch conveyer and, in the open position, permits the articles to pass the branch conveyer, means for operating said deflector, and article actuated means for controlling said deflector, operating means including a tab bar having a notch therein and positioned in the path of travel of a pin carried by an article whereby the tab bar is contacted by the pin and the open position of the deflector determined unless the latter is so positioned that it passes through the notch in the tab bar and a tab located behind the notch in the tab bar with which tab the pin passing through the notch contacts and the closed position of the deflector is determined.

23. Conveyer mechanism comprising a conveyer, a branch conveyer to which articles transported by the first named conveyer may be delivered, a movable deflector which in one position diverts the articles to the branch conveyer and in another position permits the articles to pass the branch conveyer, electrical means for moving such deflector and article actuated means for controlling such electrical means including a circuit control device, movable means adapted to trip said device, said means being moved, by contact with an article being transported by the first named conveyer, into the tripping position thereby causing said electrical means to move the deflector into a predetermined position if it does not already occupy such position.

24. Conveyer mechanism comprising a conveyer, a branch conveyer to which articles transported by the first named conveyer may be delivered, a movable deflector, which, in one position diverts the articles to the branch conveyer and in another position permits the articles to pass the branch conveyer, electrical means for moving such deflector and article actuated means for controlling such electrical means including circuit control devices and movable means adapted to trip said devices, one of said means being moved, by contact with an article being transported by the first named conveyer, into the tripping position, thereby causing said electrical means to move the deflector into a predetermined position if it does not already occupy such position.

25. Conveyer mechanism comprising a conveyer, a branch conveyer to which articles transported by the first named conveyer may be delivered, a movable deflector which, in one position diverts the articles to the branch conveyer and in another position permits the articles to pass the branch conveyer, electrical means for moving such deflector and article actuated means for controlling such electrical means including a circuit maker and movable means adapted to trip said circuit maker, said means being moved, by contact with an article being transported by the first named conveyer, into the tripping position, thereby causing said electrical means to move the deflector into a predetermined position if it does not already occupy such position.

26. Conveyer mechanism comprising a conveyer, a branch conveyer to which articles transported by the first named conveyer may be delivered, a movable deflector which, in one position diverts the articles to the branch conveyer and in another position permits the articles to pass the branch conveyer, electrical means for moving such deflector and article actuated means for controlling such electrical means including a circuit maker, a movable tab bar, having a notch therein, adapted to trip said circuit maker, a second circuit maker and a movable tab adapted to trip said circuit maker and mounted behind the slot in the tab bar, the article transported by the conveyer being provided with a pin which either contacts with said tab bar or passes through the notch therein and contact with said tab, thereby moving the contacted element to trip the circuit maker associated therewith and cause said electrical means to move the deflector into a predetermined position if it does not already occupy such position.

27. Conveyer mechanism comprising a conveyer upon which articles are transported, a branch conveyer and deflector mechanism for diverting certain of the articles to the branch conveyer and permitting others to remain on the first named conveyer, said mechanism including a movable deflector bar, positive means for moving said bar into desired positions, and control means actuated by each of the articles upon the first-named conveyer for causing said positive means to move the bar into any desired position if it be not already so located.

28. Conveyer mechanism comprising a conveyer upon which articles are transported, a branch conveyer and deflector mechanism for diverting certain of the articles to the branch conveyer and permitting others to remain on the first named conveyer, said mechanism including a movable deflector bar, a motor for positively moving said bar into desired position and circuit control means actuated by the articles for causing said motor to move the bar into any desired position if it be not already so located.

29. Conveyer mechanism comprising a conveyer upon which articles are transported, a branch conveyer and deflector mechanism for diverting certain of the articles to the branch conveyer and permitting others to remain on the first named conveyer, said mechanism including a pivotally mounted deflector bar, a motor for positively swinging said bar around its pivot into article diverting or article permitting positions and circuit control devices actuated by the article approaching the bar for causing said motor to swing the bar into either of said positions if it be not already so located.

30. Conveyer mechanism comprising a main conveyer upon which trucks are transported, certain of said trucks having an opening at the left side and other of said trucks having an opening at the right side, two branch conveyers leading from said main conveyer, the trucks on one of said branch conveyers being accessible from the right side and on the other branch conveyer being accessible from the left side, deflector mechanism associated with each branch conveyer and means carried by each of said trucks for engaging the deflector mechanism of the first branch conveyer whereby only the trucks having an opening at the right side are diverted onto the conveyer while the other trucks pass such deflector mechanism and engage the mechanism associated with the second branch conveyer by which the trucks having an opening at the left side are diverted onto that branch conveyer.

Signed by me at Syracuse, N. Y., this 27th day of January, 1930.

JOHN E. REGAN.